(12) United States Patent
Zhou et al.

(10) Patent No.: US 10,798,221 B2
(45) Date of Patent: Oct. 6, 2020

(54) INFORMATION DISPLAY METHOD, TERMINAL, AND SERVER

(71) Applicant: Huawei Technologies Co., Ltd., Shenzhen (CN)

(72) Inventors: Xingchen Zhou, Nanjing (CN); Zhitao Li, Nanjing (CN); Xiao Qin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 582 days.

(21) Appl. No.: 15/512,497

(22) PCT Filed: Sep. 18, 2014

(86) PCT No.: PCT/CN2014/086849
§ 371 (c)(1),
(2) Date: Mar. 17, 2017

(87) PCT Pub. No.: WO2016/041176
PCT Pub. Date: Mar. 24, 2016

(65) Prior Publication Data
US 2017/0272552 A1  Sep. 21, 2017

(51) Int. Cl.
*G06F 16/25* (2019.01)
*G06F 16/958* (2019.01)
(Continued)

(52) U.S. Cl.
CPC ............ *H04L 69/03* (2013.01); *G06F 16/258* (2019.01); *G06F 16/285* (2019.01);
(Continued)

(58) Field of Classification Search
CPC ....... H04L 69/03; H04L 67/02; H04L 67/303; H04L 67/42; G06F 17/30569; G06F 17/30598
(Continued)

(56) References Cited

U.S. PATENT DOCUMENTS 5,819,284 A * 10/1998 Farber ................... G06F 16/335
709/203
6,611,839 B1 * 8/2003 Nwabueze ............. G06Q 10/06
(Continued)

FOREIGN PATENT DOCUMENTS

CN   1645397 A    7/2005
CN   101072197 A   11/2007
(Continued)

OTHER PUBLICATIONS

Santhalia, Vikram, et al., "Design and Development of a User Specific Dynamic E-Magazine," arXIV:1401.2545v1[cs.IR], Cornell University Ithaca, NY 14853, Jan. 11, 2014, 19 pages.
(Continued)

*Primary Examiner* — Madhu Woolcock
(74) *Attorney, Agent, or Firm* — Slater Matsil, LLP

(57) ABSTRACT

Embodiments of the present invention provide an information display method, terminal, and server. In one embodiment, the information display method includes obtaining, by a terminal, content information of at least one content source. The at least one content source corresponds to at least two pieces of account information stored in the terminal. The method further includes integrating, by the terminal, the content information into content display information; and displaying, by the terminal, the content display information.

10 Claims, 6 Drawing Sheets

(51) Int. Cl.
*H04L 29/06* (2006.01)
*G06F 16/28* (2019.01)
*G06F 16/9535* (2019.01)
*H04L 29/08* (2006.01)
*H04L 12/58* (2006.01)

(52) U.S. Cl.
CPC .......... *G06F 16/9535* (2019.01); *H04L 67/02* (2013.01); *H04L 67/303* (2013.01); *H04L 67/42* (2013.01); *G06F 16/958* (2019.01); *H04L 51/24* (2013.01)

(58) Field of Classification Search
USPC .......................................... 709/246, 217, 219
See application file for complete search history.

(56) References Cited

U.S. PATENT DOCUMENTS

| | | | | |
|---|---|---|---|---|
| 6,983,287 | B1* | 1/2006 | Jayanti | G06F 16/48 |
| 7,219,123 | B1* | 5/2007 | Fiechter | H04M 1/72561 |
| | | | | 704/E15.045 |
| 7,774,412 | B1* | 8/2010 | Schnepel | H04L 51/066 |
| | | | | 709/206 |
| 8,875,198 | B1* | 10/2014 | Goodwin | H04N 21/25 |
| | | | | 725/87 |
| 9,378,205 | B1* | 6/2016 | Schmidt | G06F 16/93 |
| 9,400,875 | B1* | 7/2016 | Barraclough | G06F 21/10 |
| 9,426,105 | B2* | 8/2016 | Park | H04L 51/32 |
| 9,756,395 | B1* | 9/2017 | Kilbourn | H04N 21/4756 |
| 2001/0000537 | A1 | 4/2001 | Inala et al. | |
| 2001/0037359 | A1* | 11/2001 | Mockett | H04L 67/30 |
| | | | | 709/203 |
| 2001/0056447 | A1 | 12/2001 | Sumino | |
| 2002/0144174 | A1* | 10/2002 | Nwabueze | G06Q 10/06 |
| | | | | 714/1 |
| 2003/0163403 | A1 | 8/2003 | Chen et al. | |
| 2006/0069917 | A1* | 3/2006 | Martin | H04L 63/0428 |
| | | | | 713/175 |
| 2007/0157252 | A1* | 7/2007 | Perez | G06Q 30/02 |
| | | | | 725/61 |
| 2008/0165283 | A1 | 7/2008 | Brandt et al. | |
| 2008/0261569 | A1 | 10/2008 | Britt et al. | |
| 2009/0012806 | A1 | 1/2009 | Ricordi et al. | |
| 2009/0030931 | A1* | 1/2009 | Khivesara | H04N 7/163 |
| 2009/0042549 | A1 | 2/2009 | Lee | |
| 2009/0083240 | A1* | 3/2009 | Nolan | G06F 21/6227 |
| 2009/0106110 | A1* | 4/2009 | Stannard | G06Q 30/00 |
| | | | | 705/14.1 |
| 2009/0199242 | A1* | 8/2009 | Johnson | G06F 16/70 |
| | | | | 725/46 |
| 2010/0325655 | A1* | 12/2010 | Perez | G06Q 30/02 |
| | | | | 725/30 |
| 2011/0099487 | A1 | 4/2011 | Pyhalammi et al. | |
| 2012/0123992 | A1 | 5/2012 | Randall | |
| 2013/0097685 | A1* | 4/2013 | Kennedy | G06F 16/9577 |
| | | | | 726/8 |
| 2013/0244637 | A1 | 9/2013 | Ueda et al. | |
| 2018/0121955 | A1* | 5/2018 | Munro | G06Q 30/0256 |

FOREIGN PATENT DOCUMENTS

| | | |
|---|---|---|
| CN | 100517293 C | 7/2009 |
| CN | 100556007 C | 10/2009 |
| CN | 102769578 A | 11/2012 |
| CN | 102880651 A | 1/2013 |
| CN | 103310817 A | 9/2013 |
| EP | 1777632 A2 | 4/2007 |
| JP | 2002007404 A | 1/2002 |
| JP | 2003501725 A | 1/2003 |
| JP | 2005159865 A | 6/2005 |
| RU | 2008128550 A | 2/2010 |
| RU | 2408923 C2 | 1/2011 |

OTHER PUBLICATIONS

Steichen, Ben et al., "Adaptive Retrieval and Composition of Socio-Semantic Content for Personalised Customer Care", Proceedings of the International Workshop on Adaptation in Social and Semantic Web—SASWeb—2010, UMAP 2010, EEUU, Hawaii, Jun. 21, 2010, Ceur Workshop Proceedings, vol. 590, 57 pages.

Amazon, Online shopping starting with Strongest Mail Order Website, First Version, Japan, Impress Japan Corporation, Yonekazu Toda, Mar. 21, 2013, First Version, pp. 75-76. 105 and 109, with English translation, 10 pages.

* cited by examiner

INFORMATION DISPLAY METHOD, TERMINAL, AND SERVER

CROSS-REFERENCE TO RELATED APPLICATIONS

This application is a National Stage of International Application No. PCT/CN2014/086849, filed Sep. 18, 2014, which is hereby incorporated by reference in their entireties.

TECHNICAL FIELD

The present invention relates to the communications field, and in particular, to an information display method, terminal, and server.

BACKGROUND

People often deal with various daily affairs by using a web browser in a terminal or an application (APP) installed in a terminal, for example, people can log in to Amazon by using a browser or shop online by using an Amazon App; or can book tickets online by using the network "Qunar" or another travel agency network.

With an increase and diversification of user service requirements, there are more and more websites accessed by a user by using the browser, and a quantity of Apps in the terminal also increases. Various information and services required by the user are dispersedly stored in servers having different content sources. The content source can provide information or a service required by the user, and the content source may be a website, an application, or the like. With increasing applications and services, some new troubles also emerge accordingly. For example, if wanting to query information or use some services, the user needs to first consider a content source in which related information is stored, and then can open a corresponding web page or App to obtain corresponding information or a corresponding service. This query process is relatively cumbersome and time-consuming, especially when there are more content sources to be selected, the user tends to forget the content source in which the related information is stored, and in this case, a related operation is more cumbersome. At present, there is no effective solution for the foregoing situation.

SUMMARY

Embodiments of the present invention provide an information display method and apparatus, so as to facilitate an information query and enhance an interaction capability of a terminal.

According to a first aspect, an embodiment of the present invention provides an information display method, where the method includes: obtaining, by a terminal, content information of at least one content source, where the at least one content source corresponds to at least two pieces of account information stored in the terminal; integrating, by the terminal, the content information into content display information; and displaying, by the terminal, the content display information.

With reference to the first aspect, in a first implementation manner, the integrating the content information into content display information includes: converting the content information from an unstructured data format to a structured data format according to a rule; and classifying the content information of the structured data format to obtain the classified content information of the structured data format, that is, the content display information.

With reference to the first aspect, in a second implementation manner, the integrating the content information into content display information includes: classifying the content information; and converting the classified content information from an unstructured data format to a structured data format according to a rule to obtain the classified content information of the structured data format, that is, the content display information.

With reference to the first implementation manner or the second implementation manner of the first aspect, in a third implementation manner of the first aspect, a classification type in the classified content information of the structured data format includes one or more of a user identifier, a service type, or a content source.

With reference to the third implementation manner of the first aspect, in a fourth implementation manner of the first aspect, the service type includes one or more of an express, music, a photo, a contact message, an event prompt message, a bill, or the like.

With reference to any one of the first to the fourth implementation manners of the first aspect, in a fifth implementation manner of the first aspect, the displaying the content display information includes: displaying the content display information in a reversed order according to update time of the content display information.

With reference to any one of the implementation manners from the first aspect to the fifth implementation manner of the first aspect, in a sixth implementation manner of the first aspect, the obtaining, by a terminal, content information of at least one content source includes: obtaining, by the terminal, the at least two pieces of account information and address information of the content source corresponding to the at least two pieces of account information; sending, by the terminal, a first obtaining request to the content source according to the at least two pieces of account information and the address information of the content source corresponding to the at least two pieces of account information; and receiving, by the terminal, the content information sent by the content source according to the first obtaining request.

With reference to any one of the implementation manners from the first aspect to the fifth implementation manner of the first aspect, in a seventh implementation manner of the first aspect, the obtaining, by a terminal, content information of at least one content source includes: sending, by the terminal, a second obtaining request to a server; and receiving, by the terminal, the content information that is obtained by the server according to the second obtaining request from the content source corresponding to the at least two pieces of account information.

With reference to any one of the implementation manners of the first aspect, in an eighth implementation manner of the first aspect, the terminal displays the content display information at N levels, where N is an integer greater than or equal to 2.

According to a second aspect, an embodiment of the present invention provides an information display method, where the method includes: sending, by a terminal, an obtaining request to a server to obtain content information of at least one content source, where the at least one content source corresponds to at least two pieces of account information stored in the terminal; receiving, by the terminal, content display information sent by the server according to the obtaining request, where the content display information is obtained by integrating, by the server, content information obtained from the content source corresponding to the at least two pieces of account information; and displaying, by the terminal, the content display information.

With reference to the second aspect, in a first implementation manner of the second aspect, the content display information is classified content information of a structured data format.

With reference to the first implementation manner of the second aspect, in a second implementation manner of the second aspect, the classification type includes one or more of a user identifier, a service type, or a content source.

With reference to the second implementation manner of the second aspect, in a third implementation manner of the second aspect, the service type includes one or more of an express, music, a photo, a contact message, an event prompt message, a bill, or the like.

With reference to any one of the implementation manners of the second aspect, in a fourth implementation manner of the second aspect, the displaying the content display information includes: displaying the content display information in a reversed order according to update time of the content display information.

With reference to any one of the implementation manners of the second aspect, in a fifth implementation manner of the second aspect, the terminal displays the content display information at N levels, where N is an integer greater than or equal to 2.

According to a third aspect, an embodiment of the present invention provides an information display method, where the method includes: obtaining, by a server, at least two pieces of account information and address information of a content source corresponding to the at least two pieces of account information, where the at least two pieces of account information correspond to at least one content source; obtaining, by the server, content information from the content source corresponding to the at least two pieces of account information according to the at least two pieces of account information and the address information of the content source corresponding to the at least two pieces of account information; integrating, by the server, the content information into a content display message; and sending, by the server, the content display information to a terminal for displaying.

With reference to the third aspect, in a first implementation manner of the third aspect, the integrating the content information into content display information includes: converting the content information from an unstructured data format to a structured data format according to a rule; and classifying the content information of the structured data format to obtain the classified content information of the structured data format, that is, the content display information.

With reference to the third aspect, in a second implementation manner of the third aspect, the integrating the content information into content display information includes: classifying the content information; and converting the classified content information from an unstructured data format to a structured data format according to a rule to obtain the classified content information of the structured data format, that is, the content display information.

With reference to any one of the implementation manners of the third aspect, in a third implementation manner of the third aspect, before the obtaining at least two pieces of account information and address information of the content source corresponding to the at least two pieces of account information, the method further includes: receiving, by the server, an obtaining request sent by the terminal, where the obtaining request is used to instruct the server to obtain the content information of the content source.

According to a fourth aspect, an embodiment of the present invention provides an information display terminal, where the terminal includes: a collection module, configured to obtain content information of at least one content source, where the at least one content source corresponds to at least two pieces of account information stored in the terminal; an integration module, configured to integrate the content information into content display information; and a display module, configured to display the content display information.

With reference to the fourth aspect, in a first implementation manner of the fourth aspect, the integration module includes: a conversion module, configured to convert, according to a rule, the content information obtained by the collection module from an unstructured data format to a structured data format; and a classification module, configured to classify the content information of the structured data format to obtain the classified content information of the structured data format, that is, the content display information.

With reference to the fourth aspect, in a second implementation manner of the fourth aspect, the integration module includes: a classification module, configured to classify the content information obtained by the collection module; and a conversion module, configured to convert the classified content information from an unstructured data format to a structured data format according to a rule to obtain the classified content information of the structured data format, that is, the content display information.

With reference to the first implementation manner or the second implementation manner of the fourth aspect, in a third implementation manner of the fourth aspect, a classification type in the classified content information of the structured data format includes one or more of a user identifier, a service type, or a content source.

With reference to the third implementation manner of the fourth aspect, in a fourth implementation manner of the fourth aspect, the service type includes one or more of an express, music, a photo, a contact message, an event prompt message, a bill, or the like.

With reference to any one of the first to the fourth implementation manners of the fourth aspect, in a fifth implementation manner of the fourth aspect, the displaying the content display information includes: displaying the content display information in a reversed order according to update time of the content display information.

With reference to any one of the implementation manners from the fourth aspect to the fifth implementation manner of the fourth aspect, in a sixth implementation manner of the fourth aspect, the obtaining, by a terminal, content information of at least one content source includes: obtaining, by the terminal, the at least two pieces of account information and address information of the content source corresponding to the at least two pieces of account information; sending, by the terminal, a first obtaining request to the content source according to the at least two pieces of account information and the address information of the content source corresponding to the at least two pieces of account information; and receiving, by the terminal, the content information sent by the content source according to the first obtaining request.

With reference to any one of the implementation manners from the fourth aspect to the fifth implementation manner of the fourth aspect, in a seventh implementation manner of the fourth aspect, the obtaining, by a terminal, content information of at least one content source includes: sending, by the terminal, a second obtaining request to a server; and receiving, by the terminal, the content information that is obtained by the server according to the second obtaining request from the content source corresponding to the at least two pieces of account information.

With reference to any one of the implementation manners of the fourth aspect, in an eighth implementation manner of the fourth aspect, the display module displays the content display information at N levels, where N is an integer greater than or equal to 2.

According to a fifth aspect, an embodiment of the present invention provides an information display terminal, where the terminal includes: a sending module, configured to send an obtaining request to a server to obtain content information of at least one content source, where the at least one content source corresponds to at least two pieces of account information stored in the terminal; a receiving module, configured to receive content display information sent by the server according to the obtaining request, where the content display information is obtained by integrating, by the server, content information obtained from the content source corresponding to the at least two pieces of account information; and a display module, configured to display the content display information.

With reference to the fifth aspect, in a first implementation manner of the fifth aspect, the content display information is classified content information of a structured data format.

With reference to the first implementation manner of the fifth aspect, in a second implementation manner of the fifth aspect, the classification type includes one or more of a user identifier, a service type, or a content source.

With reference to the second implementation manner of the fifth aspect, in a third implementation manner of the fifth aspect, the service type includes one or more of an express, music, a photo, a contact message, an event prompt message, a bill, or the like.

With reference to any one of the implementation manners of the fifth aspect, in a fourth implementation manner of the fifth aspect, the displaying the content display information includes: displaying the content display information in a reversed order according to update time of the content display information.

With reference to any one of the implementation manners of the fifth aspect, in a fifth implementation manner of the fifth aspect, the display module displays the content display information at N levels, where N is an integer greater than or equal to 2.

According to a sixth aspect, an embodiment of the present invention provides an information display server, where the server includes: an obtaining module, configured to obtain at least two pieces of account information and address information of a content source corresponding to the at least two pieces of account information, where the at least two pieces of account information correspond to at least one content source; a collection module, configured to obtain content information from the content source corresponding to the at least two pieces of account information according to the at least two pieces of account information and the address information of the content source corresponding to the at least two pieces of account information; an integration module, configured to integrate the content information into content display information; and a sending module, configured to send the content display information to a terminal for displaying.

With reference to the sixth aspect, in a first implementation manner of the sixth aspect, the integration module includes: a conversion module, configured to convert, according to a rule, the content information obtained by the collection module from an unstructured data format to a structured data format; and a classification module, configured to classify the content information of the structured data format to obtain the classified content information of the structured data format, that is, the content display information.

With reference to the sixth aspect, in a second implementation manner of the sixth aspect, the integration module includes: a classification module, configured to classify the content information obtained by the collection module; and a conversion module, configured to convert the classified content information from an unstructured data format to a structured data format according to a rule to obtain the classified content information of the structured data format, that is, the content display information.

With reference to any one of the implementation manners of the sixth aspect, in a third implementation manner of the sixth aspect, before the obtaining at least two pieces of account information and address information of the content source corresponding to the at least two pieces of account information, the method further includes: receiving, by the server, an obtaining request sent by the terminal, where the obtaining request is used to instruct the server to obtain the content information of the content source.

According to a seventh aspect, an embodiment of the present invention provides an information display terminal, where the terminal includes: a processor, a memory, a display screen, and a transceiver, where the processor, the memory, the display screen, and the transceiver perform communication by using a bus; where the transceiver is configured to obtain content information of at least one content source, where the at least one content source corresponds to at least two pieces of account information stored in the terminal; the processor is configured to integrate the content information into content display information; and the display screen is configured to display the content display information.

With reference to the seventh aspect, in a first implementation manner of the seventh aspect, the processor is specifically configured to: convert the content information from an unstructured data format to a structured data format according to a rule; and classify the content information of the structured data format to obtain the classified content information of the structured data format, that is, the content display information.

With reference to the seventh aspect, in a second implementation manner of the seventh aspect, that the processor is configured to integrate the content information into content display information includes: classifying the content information; and converting the classified content information from an unstructured data format to a structured data format according to a rule to obtain the classified content information of the structured data format, that is, the content display information.

With reference to the first implementation manner or the second implementation manner of the seventh aspect, in a third implementation manner of the seventh aspect, a classification type of the classified content information of the structured data format includes one or more of a user identifier classification, a service type classification, or a content source classification.

With reference to the third implementation manner of the seventh aspect, in a fourth implementation manner of the seventh aspect, the service type includes one or more of an express, music, a photo, a contact message, an event prompt message, a bill, or the like.

With reference to any one of the first to the fourth implementation manners of the seventh aspect, in a fifth implementation manner of the seventh aspect, the displaying the content display information includes: displaying the content display information in a reversed order according to update time of the content display information.

With reference to any one of the implementation manners from the seventh aspect to the fifth implementation manner of the seventh aspect, in a sixth implementation manner of the seventh aspect, the obtaining content information of at least one content source includes: obtaining, by the processor, the at least two pieces of account information and address information of the content source corresponding to the at least two pieces of account information; sending, by the transceiver, a first obtaining request to the content source according to the at least two pieces of account information and the address information of the content source corresponding to the at least two pieces of account information; and receiving, by the transceiver, the content information sent by the content source according to the first obtaining request.

With reference to any one of the implementation manners from the seventh aspect to the fifth implementation manner of the seventh aspect, in a seventh implementation manner of the seventh aspect, the obtaining content information of at least one content source includes: sending, by the transceiver, a second obtaining request to a server; and receiving, by the transceiver, the content information that is obtained by the server according to the second obtaining request from the content source corresponding to the at least two pieces of account information.

With reference to any one of the implementation manners of the seventh aspect, in an eighth implementation manner of the seventh aspect, the display screen displays the content display information at N levels, where N is an integer greater than or equal to 2.

According to an eighth aspect, an embodiment of the present invention provides an information display terminal, where the terminal includes: a processor, a memory, a display screen, and a transceiver, where the processor, the memory, the display screen, and the transceiver perform communication by using a bus; where the transceiver is configured to send an obtaining request to a server to obtain content information of at least one content source, where the at least one content source corresponds to at least two pieces of account information stored in the terminal; the transceiver is further configured to receive content display information sent according to the obtaining request by the server, where the content display information is obtained by integrating, by the server, content information obtained from the content source corresponding to the at least two pieces of account information; the processor is configured to parse the received content display information; and the display screen is configured to display the content display information.

With reference to the eighth aspect, in a first implementation manner of the eighth aspect, the content display information is classified content information of a structured data format.

With reference to the first implementation manner of the eighth aspect, in a second implementation manner of the eighth aspect, the classification type includes one or more of a user identifier, a service type, or a content source.

With reference to the second implementation manner of the eighth aspect, in a third implementation manner of the eighth aspect, the service type includes one or more of an express, music, a photo, a contact message, an event prompt message, a bill, or the like.

With reference to any one of the implementation manners of the eighth aspect, in a fourth implementation manner of the eighth aspect, the displaying the content display information includes: displaying the content display information in a reversed order according to update time of the content display information.

With reference to any one of the implementation manners of the eighth aspect, in a fifth implementation manner of the eighth aspect, the display screen displays the content display information at N levels, where N is an integer greater than or equal to 2.

According to a ninth aspect, an embodiment of the present invention provides an information display server, where the server includes: a processor, a memory, a display screen, and a transceiver, where the processor, the memory, the display screen, and the transceiver perform communication by using a bus; where the processor is configured to obtain at least two pieces of account information and address information of a content source corresponding to the at least two pieces of account information, where the at least two pieces of account information correspond to at least one content source; the transceiver is configured to obtain content information from the content source corresponding to the at least two pieces of account information according to the at least two pieces of account information and the address information of the content source corresponding to the at least two pieces of account information; the processor is further configured to integrate the content information into a content display message; and the transceiver is further configured to send the content display information to a terminal for displaying.

With reference to the ninth aspect, in a first implementation manner of the ninth aspect, the processor is specifically configured to: convert the content information from an unstructured data format to a structured data format according to a rule; and classify the content information of the structured data format to obtain the classified content information of the structured data format, that is, the content display information.

With reference to the ninth aspect, in a second implementation manner of the ninth aspect, the processor is specifically configured to: classify the content information; and convert the classified content information from an unstructured data format to a structured data format according to a rule to obtain the classified content information of the structured data format, that is, the content display information.

With reference to any one of the implementation manners of the ninth aspect, in a third implementation manner of the ninth aspect, before the obtaining at least two pieces of account information and address information of the content source corresponding to the at least two pieces of account information, further includes: receiving, by the server, an obtaining request sent by the terminal, where the obtaining request is used to instruct the server to obtain the content information of the content source.

According to the solutions provided in the foregoing embodiments of the present invention, content information of a content source is obtained, integrated, and then displayed to a user by classification, so that it is convenient and intuitive for the user to query information.

BRIEF DESCRIPTION OF THE DRAWINGS

To describe the technical solutions in the embodiments of the present invention more clearly, the following briefly introduces the accompanying drawings required for describing the embodiments or in the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
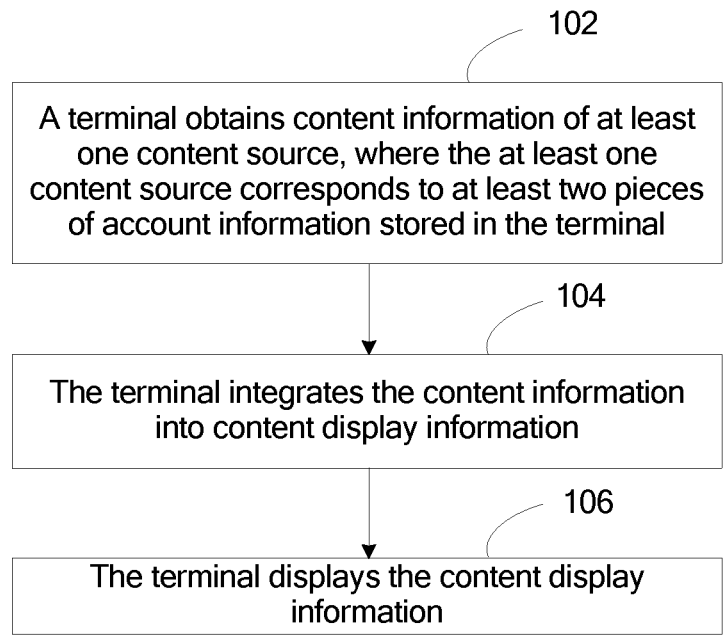
FIG. 1 is a schematic flowchart of an information display method according to Embodiment 1 of the present invention.

To make the objectives, technical solutions, and advantages of the present invention clearer, the following further describes the embodiments of the present invention in detail with reference to the accompanying drawings. To understand the present invention, numerous specific details are mentioned in the following detailed description. However, a person skilled in the art should understand that the present invention may be implemented without requiring these specific details. In another example, well known methods, processes, components, circuits, and the like are not described in detail, so as to prevent the embodiments from being blurred unnecessarily. Apparently, the described embodiments are some but not all of the embodiments of the present invention. All other embodiments obtained by a person of ordinary skill in the art based on the embodiments of the present invention without creative efforts shall fall within the protection scope of the present invention.

Some procedures described in the following include multiple operations that appear in a specific order. However, it should be clearly understood that these operations may be performed not in the order in which the operations appear in this specification, or may be performed in parallel. Sequence numbers such as 102 and 104 of operations are merely used to distinguish different operations. The sequence numbers themselves do not represent any execution order. In addition, these procedures may include more or less operations, and these operations may be performed in an order or may be performed in parallel.

It should be noted that description such as "first" or "second" in this specification is used to distinguish different messages, devices, modules, or the like, which neither represents a sequence, nor imposes a limitation that the "first" and the "second" are different types. "If" in this specification represents that a condition or a state is met, including meanings such as "when", "the condition is met", and "determining is valid". A "message" is a carrier that bears some information, including various forms such as signaling, a communication signal, and a data message.

It should be noted that a terminal described in the embodiments of the present invention includes but is not limited to user equipment having a display function, such as a smartphone, a tablet computer, an intelligent appliance, a global positioning system (Global Position System, GPS) device, a wireless fidelity (Wireless Fidelity, Wi-Fi) hotspot device, a wireless network access device, intelligent glasses, an intelligent watch, and another wearable intelligent device.

It should be noted that a content source described in the embodiments of the present invention is used to provide a user with needed information or a needed service, where the content source may be a website, an application, or the like. Different content sources described in the embodiments of the present invention may be from a same vendor, or may be from different vendors. For example, the content source may include a website such as Amazon, Qunar, or YouTube.

The user may select the content source by using the terminal, and obtain content information from the content source. The content information indicates user-related information in the content source, and may include specific content such as a service selected by the user and information stored by the user. For example, the content information may be specific information of a commodity purchased from Taobao, including a name of the commodity, an express status, and the like. The content information may be from a same content source, that is, the terminal obtains one piece of content information of one content source or multiple pieces of content information of one content source. The content information may be from different content sources, that is, multiple pieces of content information obtained by the terminal may be from different content sources. The content information may be obtained from the terminal, or may be obtained from a server of a website, an application, or the like.

Account information of the content source is information used by the content source to verify the terminal when the content information is obtained from the content source, which may include a corresponding user name, or a user name and a user password, or the like. For example, account information of an SMS application may be an identifier of a subscriber identity module card in the terminal. Account information of the Amazon website may be a user name and a password registered by a user at Amazon by using the terminal.

It should be noted that a data format in the embodiments of the present invention indicates an orchestration format in which data is stored in a file or a record. If, in the present invention, an information aggregation application runs to implement a method in the embodiments of the present invention, both content information of a structured data format and content information of an unstructured data format described in the embodiments of the present invention are relative to a storage format of data of the application. The structured data format indicates that fields of a data orchestration format have definite and clear meanings and are arranged according to a determined order, and is the storage format of the data of the application. The application may directly read and use, and display the data of the structured data format. The unstructured data format is data except the structured data format, that is, a data format that cannot be directly read and used, and displayed by the information aggregation application. For example, the content information obtained from Amazon by the information aggregation application may be a Hypertext Markup Language (HyperText Mark-up Language, HTML) file, which includes lots of data that cannot be directly identified by the information aggregation application, and features an indefinite meaning, disorder, or non-uniform arrangement with respect to the data format of the information aggregation application. The information aggregation application may extract, according to a correspondence between the Amazon HTML file and the data format preset by the information aggregation application, content required by the information aggregation application, and the content is orchestrated according to the data format of the information aggregation application, such as an array or a database, that is, the content information of the structured data format of the information aggregation application is obtained.

Embodiment 1 of the present invention provides an information display method. As shown in FIG. 1, the method may be executed by a terminal. The method includes the following steps.

Step 102: Obtain content information of at least one content source, where the at least one content source corresponds to at least two pieces of account information stored in the terminal.

Step 104: Integrate the content information into content display information.

Step 106: Display the content display information.

Optionally, the method in this embodiment of the present invention may be executed by the terminal by running an information aggregation application. When the information aggregation application is started, step 102 may be executed. There are multiple manners of starting the information aggregation application, for example, clicking an icon corresponding to the information aggregation application or pressing a shortcut key corresponding to the information aggregation application. A manner of starting the information aggregation application is not limited in this embodiment of the present invention.

Optionally, an update button may be further set in an interface of the information aggregation application, and when a user triggers update in a manner such as clicking the update button, step 102 may be executed.

Optionally, the terminal may also execute step 102 at a scheduled time. By means of setting a timer or in another manner, when a preset time interval expires or a preset time point is reached, step 102 is executed. After step 102 is executed, step 104 and step 106 may be directly executed; or another step may be executed before step 104 and step 106, and then step 104 and step 106 are executed. For example, the information aggregation application sets by default or the user may set an interval of five minutes during which the displayed content display message is updated once, that is, methods in step 102 to step 106 are executed every five minutes to update the displayed content display message. The information aggregation application sets by default or the user may also set a specific time point or some time points at which the displayed content display message is updated, that is, the methods in step 102 to step 106 are executed at the time point to update the displayed content display message.

In a specific implementation process, a user may register a system account used to log in to the foregoing information aggregation application. After logging in to the system account, the user may select or input, by using the terminal, a content source associated with the system account, and account information of the content source associated with the system account. For example, if wanting to obtain content information of Amazon and Taobao by using the information aggregation application, the user may first register and log in to a system account, and add Amazon and Taobao, and corresponding account information of Amazon and corresponding account information of Taobao to the system account. It may be understood that the content source associated with the system account or the account information of the content source may also be modified or deleted after added. This embodiment of the present invention sets no limitation thereto. It may be understood that there may also be two or more pieces of account information corresponding to one content source. Optionally, regardless of whether the content source associated with the system account or the account information of the content source is added, modified, or deleted, the information aggregation application updates corresponding information into the stored account information of the content source in a timely manner.

In a specific implementation process, the terminal may obtain content information of the content source directly from the content source, or from a server corresponding to the terminal. In an implementation manner, step 102 in which a terminal obtains content information of at least one content source includes: obtaining the at least two pieces of account information and address information of the content source corresponding to the at least two pieces of account information; sending a first obtaining request to the content source according to the at least two pieces of account information and the address information of the content source corresponding to the at least two pieces of account information; and receiving the content information sent by the content source according to the first obtaining request.

The address information of the content source refers to an address by which the corresponding content source can be accessed, such as an Amazon address www.amazon.cn. It may be multi-threaded processing when the terminal obtains content information from different content sources. The multi-threaded processing indicates that the content information of the different content sources is obtained simultaneously. Optionally, specific implementation of obtaining the content information from the content source varies according to different specific situations. For example, for a content source of an open application programming interface (Application Programming Interface, API for short), the content information may be obtained by using the open API. For a content source of a non-open API, the content information may be obtained by logging in to the content source in a simulated manner according to the account information of the content source. The simulated login indicates that the information aggregation application logs in to the content source according to the account information of the content source without requiring a user operation, and the terminal also does not display a login interface and a login process.

In another implementation manner, step 102 in which a terminal obtains content information of at least one content source includes: sending a second obtaining request to a server; and receiving the content information that is obtained by the server according to the second obtaining request from the content source corresponding to the at least two pieces of account information.

Before sending the second obtaining request to the server, the terminal may first obtain account information and address information that are of a content source. The second obtaining request sent by the terminal to the server includes the address information and the account information that are of the content source. The account information and the address information that are of the content source include at least two pieces of account information and the address information of the content source corresponding to the at least two pieces of account information, and the at least two pieces of account information correspond to at least one content source. If the server stores the account information of the content source and the address information of the content source, the obtaining request sent by the terminal to the server may include the account information and the address information that are of the content source, or may include only other information that can instruct the server to obtain the account information and the address information that are of the content source of the content information, such as system account information and content source information. The system account information includes a system account or a system account identifier, where the system account identifier uniquely indicates the system account. The server may obtain, according to the system account information, the stored account information and the stored address information that are of the content source associated with the system account. The content source information may be a content source identifier or the address information of the content source, where the content source identifier can uniquely indicate an address of the content source, and may be a digit, a character, or the like. The present invention sets no limitation on a form of the content source identifier. It may be multi-threaded processing when the terminal obtains the content information from the corresponding server.

Optionally, step 102 further includes authentication before the content information of the content source is obtained.

The authentication may be that the content source authenticates a related permission of the account information when the information aggregation application logs in to the content source according to the account information of the content source. The authentication may also be that the information aggregation application includes account login authentication: after the information aggregation application logs in to the content source, an authentication message of the content source may be obtained, such as a Cookie, where the Cookie is an encryption form of encrypting an account name of the content source, and different content sources correspond to different Cookies. The authentication message may be stored in a specific form. For example, the authentication message and a system identifier that identifies the system account are stored in an encryption form. When the information aggregation application logs in to the content source again according to the account information of the content source to obtain the content information, the stored authentication message is first obtained according to account information of the system account and the account information of the content source. When the information aggregation application obtains the content information from the content source, a message sent by the terminal carries the authentication message, and the content source authenticates a permission according to the authentication message. The authentication is described in this embodiment of the present invention by using only an example, and a specific form of the authentication is not limited. The authentication may further ensure security of a user account.

Figure 1A:
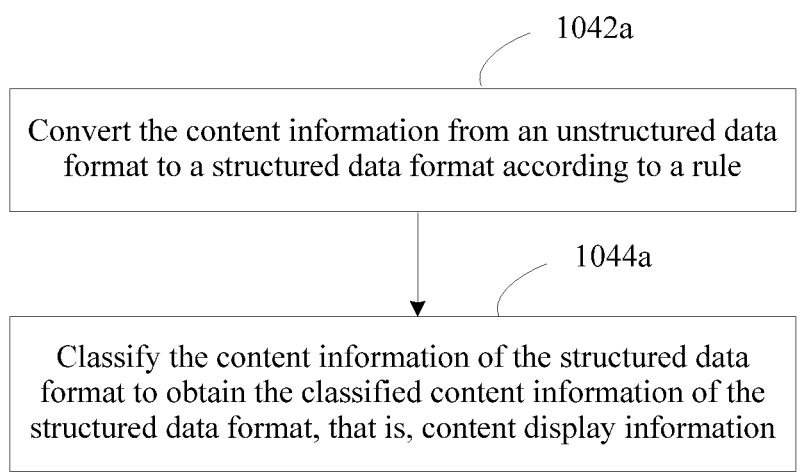
FIG. 1a is a schematic flowchart of an implementation method of an information display method according to Embodiment 1 of the present invention.

Optionally, an implementation manner of integrating the content information into content display information in step 104 is shown in FIG. 1a, including the following steps.

Step 1042a: Convert the content information from an unstructured data format to a structured data format according to a rule.

Step 1044a: Classify the content information of the structured data format to obtain the classified content information of the structured data format, that is, the content display information.

The converting the content information from an unstructured data format to a structured data format according to a rule in step 1042a may facilitate uniform display of needed content display information. The rule is a correspondence of data format conversion, that is, after the content information of the unstructured data format is obtained, according to a correspondence in the rule between the content information of the unstructured data format and the content information of the structured data format, the corresponding content information of the structured data format is obtained from the content information of the unstructured data format. Content information of each content source has a different data format; therefore, there are different rules for different content sources. Optionally, the content source described in this embodiment of the present invention is a customized content source, so as to improve accuracy of obtaining the content information. The customized content source indicates that the content source added by the information aggregation application is one or more of content sources that include a rule in this application. The content source that includes a rule indicates that content information corresponding to the content source is analyzed, and a rule corresponding to the data format conversion of the content information of the content source is stored. Specifically, for a content source of an open API, the content information of the content source may be obtained by using the API, and according to the rule, needed content information is extracted from the content information of the content source and is stored in a structured data format of the information aggregation application. For a content source of a non-open API, after related content information is obtained by logging in to the content source in a simulated manner, obtained content information of an unstructured data format may be converted to content information of a structured data format of the information aggregation application according to a rule. Optionally, the rule may be first stored in the terminal or the server. When the content information of the content source is obtained, a corresponding rule is loaded, and the content information of the structured data format is obtained according to a correspondence in the rule. Optionally, a rule center may be set, which may be set in the terminal or the server. When the rule needs to be updated, for example, a content source data structure of obtaining the content information changes or a new content source rule is added, a new rule may be updated into the rule center, and the rule is updated in a manner of pushing the rule to the information aggregation application or in a manner of updating the information aggregation application (such as application upgrade). The pushing is sending data information to the terminal by means of communication between the server and the terminal. According to this embodiment of the present invention, rule update may be implemented by using a method of the pushing, such as adding a rule or replacing a rule. The updating the application is updating the application to a new version. That the rule is updated in a manner of updating the information aggregation application indicates that the new rule is added to the information aggregation application of the new version, and the rule is updated when it is detected that a user installs the application of the new version.

The classifying the content information of the structured data format in step 1044*a* is executed according to a classification of the information aggregation application. The classification of the information aggregation application may be a user-defined classification, or may be selecting some classifications that have been set in the application. A specific form of the classification is not limited in this embodiment of the present invention.

Optionally, the classification of the information aggregation application may include one or a combination of a classification based on a user identifier, a classification based on a service type, a classification based on a content source, or the like. The classification based on a user identifier is a classification according to different user identifiers, where the user identifier refers to a field that can indicate a user identity, and users having a same user identifier are a same user. Account information of each content source corresponds to one user identifier. The user identifier may be a character, a digit, or the like, and a specific form of the user identifier is not limited. For example, the information aggregation application includes information about two different user identifiers, and the terminal may classify, according to the user identifier, information having a same user identifier into a category. If these two user identifiers respectively identify Jack and Tom, all content information of Jack is classified into a category, and information about Tom is classified into a category. The classification based on a service type is an attributive classification based on the content information. A type of the classification based on a service type may include one or more of an express, music, a photo, a contact message, an event prompt message, a bill, or the like. Content information having a same service type or having a same service type identifier is classified into a category. Specifically, the express category indicates that all content information including express information is classified into a category, which may specifically include express information in a content source such as Amazon, Jingdong, or Taobao. A music-based classification indicates that content information whose attribute is music is classified into a category, which may include web online music, qq music, music stored in the terminal, or the like. A photo-based classification indicates that obtained photo album information is classified into a category, which may include a photo album in flickr, a photo album in instagram, or the like. The contact message category may include information such as an SMS message, a call, Weibo, or an email. The bill category indicates purchased bill information, such as purchase time of the bill, valid time of the bill, or usable time of the bill, which may specifically include a purchased air ticket, a purchased railway ticket, or a purchased cinema ticket. The classification based on a content source is a classification based on a source of the content information, that is, information of a same content source is classified into a category. For example, all content information obtained from Taobao is classified into a category, which may include content information of multiple Taobao accounts, or multiple pieces of content information included by one Taobao account, or the like. Similarly, content information obtained from Jingdong may be classified into a category; content information of Sina Weibo is classified into a category, or the like. A classification manner included in this embodiment of the present invention further includes one or a combination of the foregoing classifications. For example, the one or the combination of the classifications may include a level-1 classification and a level-2 classification, where the level-2 classification is subordinate to the level-1 classification. Specifically, if the level-1 classification is the classification based on a service type, such as an express, and the level-2 classification is the classification based on a user identifier, such as Jack and Tom, express information of Jack is displayed together, and express information of Tom is displayed together, but both the express information of Jack and that of Tom are displayed under the express category. The classification of the content information is described in this embodiment of the present invention by using only an example, and specific content and a specific form that are of the classification are not limited.

Figure 1B:
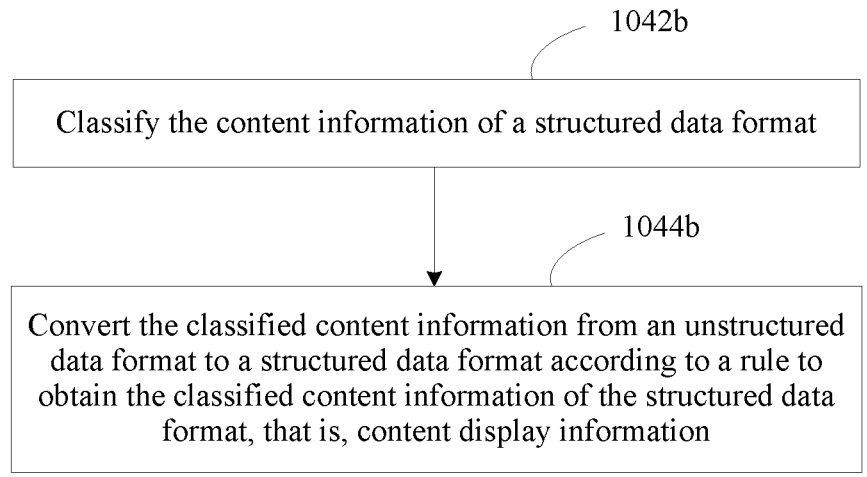
FIG. 1b is a schematic flowchart of another implementation method of an information display method according to Embodiment 1 of the present invention.

Optionally, another implementation manner of integrating the content information into content display information in step 104 is shown in FIG. 1*b*, including the following steps.

Step 1042*b*: Classify the content information.

Step 1044*b*: Convert the classified content information from an unstructured data format to a structured data format according to a rule to obtain the classified content information of the structured data format, that is, the content display information.

In a specific implementation process, the method in step 1042*b* to step 1044*b* is similar to the method in step 1042*a* to step 1044*a*. According to the method in step 1042*b* to step 1044*b*, first the obtained content information is classified, and then the classified content information is converted from the unstructured data format to the structured data format according to the rule; however, according to the method in step 1042*a* to step 1044*a*, first the content information is converted from the unstructured data format to the structured data format according to the rule, and then the content information of the structured data format is classified. A specific classification method and the method of converting the unstructured data format to the structured data format according to the rule are described in step 1042*a* and step 1044*a* in detail, and details are not described herein.

Optionally, after the "integrating the content information into content display information" in step 104, the method may further include storing the content display information. Storing the content display information is storing the integrated content display information. Storing the content display information may be executed before or after step 106 of displaying the content display information, or executed at the same time with step 106. Storing the content display information further includes comparing the content display information with the stored content display information, and updating the stored content display information. The updating the stored content display information may specifically include: if current content display information exists, the stored content display information is replaced, and is updated to the current content display information; if the current content display information does not exist, the content display information is directly added/created.

Optionally, in step 106, the content display information is the classified content information of the structured data format. The displaying the content display information includes: displaying the content display information according to update time of the content display information. Optionally, the information aggregation application may display the content display information in a reversed order according to the update time of the content display information. That is, the classified content display information is arranged and displayed in a reversed order according to the update time of the content display information corresponding to each classification. The reversed order indicates that the classified content display information is arranged in a reversed order according to the update time of the information, that is, latest content display information is first displayed in each classification, and then the content display information is arranged and displayed successively according to the update time.

Optionally, the displaying the content display information includes displaying the content display information by levels. The content display information may be displayed at N levels, where N is greater than or equal to 1. Optionally, displaying the content display information by levels corresponds to classifying the foregoing content display information. Specifically, for example, the content display information is displayed at two levels, where a level-1 display corresponds to a level-1 classification, a level-2 display corresponds to a level-2 classification, and the level-2 display is subordinate to the level-1 display. For example, a combination of two classifications is set in the information aggregation application. A level-1 classification based on a service type further includes a level-2 classification based on a content source, and corresponding content display information is respectively express information from Taobao and Jingdong, and photo information from flickr; in that way, the express information from Taobao and Jingdong is displayed under the express level-1 display, and the photo information from the flickr is displayed under the photo level-1 display; in addition, all express information from Taobao is displayed under the Taobao level-2 classification, and all express information from Jingdong is displayed under the Jingdong level-2 classification. If this content display information is further separately from different users, that is, the content display information has different user identifiers, the content display information may be displayed at three levels. Specific classification information is similar to display at two levels, and details are not described. Optionally, a first display page of the information aggregation application, that is, a page including all level-1 display or level-1 classification information, may display all or a part of content display information of the level-1 display or that of the level-1 classification. When the part of the content display information is displayed, a display area of each level-1 display has a link for accessing a second display page corresponding to the content display information of the level-2 display. On the first display page of the application, all levels of display may be set to have a same display manner. For example, one piece of latest content display information is displayed under each level-1 display. All levels of display may also be set to have different display forms. For example, the first display page displays one piece of latest express information, two latest contact messages, and the like. A specific setting form may be selected and adjusted according to a specific situation, which is not limited in this embodiment of the present invention. Optionally, the first display page or the second display page that displays the content display information has a link for accessing a corresponding content source.

Optionally, the displaying the content display information further includes updating the displayed content display information in real time. The updating the displayed content display information in real time may be updating according to update time set by a system by default or updating according to update time set by a user, or may be updating when an application detects a trigger mechanism, for example, detecting that the user taps a button or a link. The updating the displayed content display information in real time further includes executing all cases in step 102. A case of executing step 102 is described above, and details are not described herein.

According to an information display method provided in this embodiment, a terminal obtains content information of a content source, integrates the content information, and then displays integrated content information to a user by classification, so that it is concise and intuitive for the user to query information without cumbersomeness.

As shown in FIG. 2, Embodiment 2 of the present invention provides an information display method.

Figure 2A:
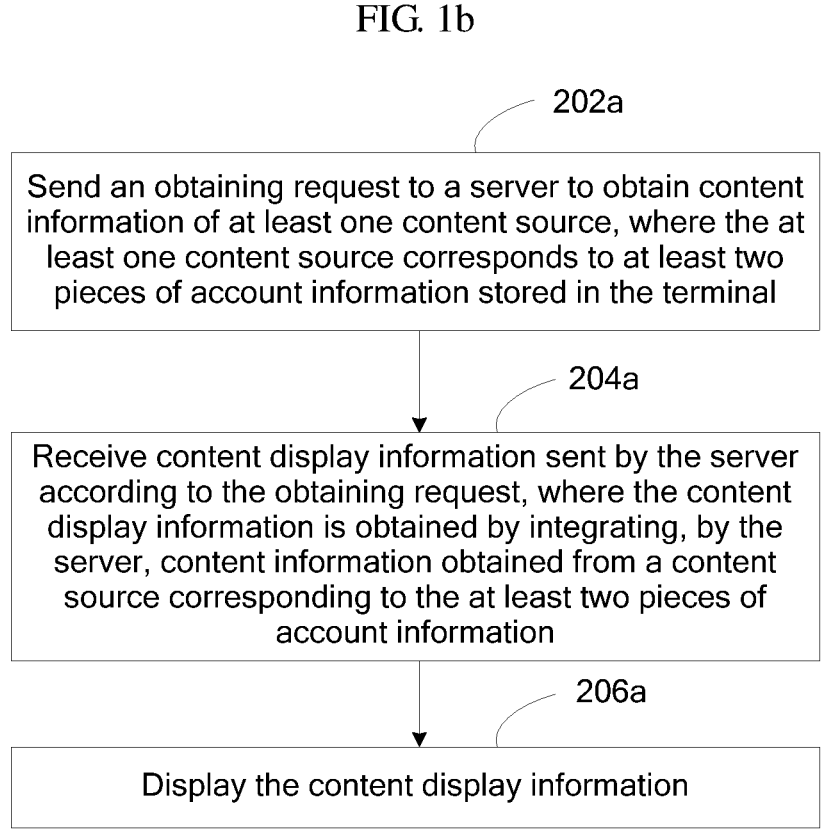
FIG. 2a is a schematic flowchart of an information display method according to Embodiment 2 of the present invention.

When this method is executed on a side of a terminal, a flowchart of the method is shown in FIG. 2a, including the following steps.

Step 202a: Send an obtaining request to a server to obtain content information of at least one content source, where the at least one content source corresponds to at least two pieces of account information stored in the terminal.

Step 204a: Receive content display information sent by the server according to the obtaining request, where the content display information is obtained by integrating, by the server, the content information obtained from the content source corresponding to the at least two pieces of account information.

Step 206a: Display the content display information.

Figure 2B:
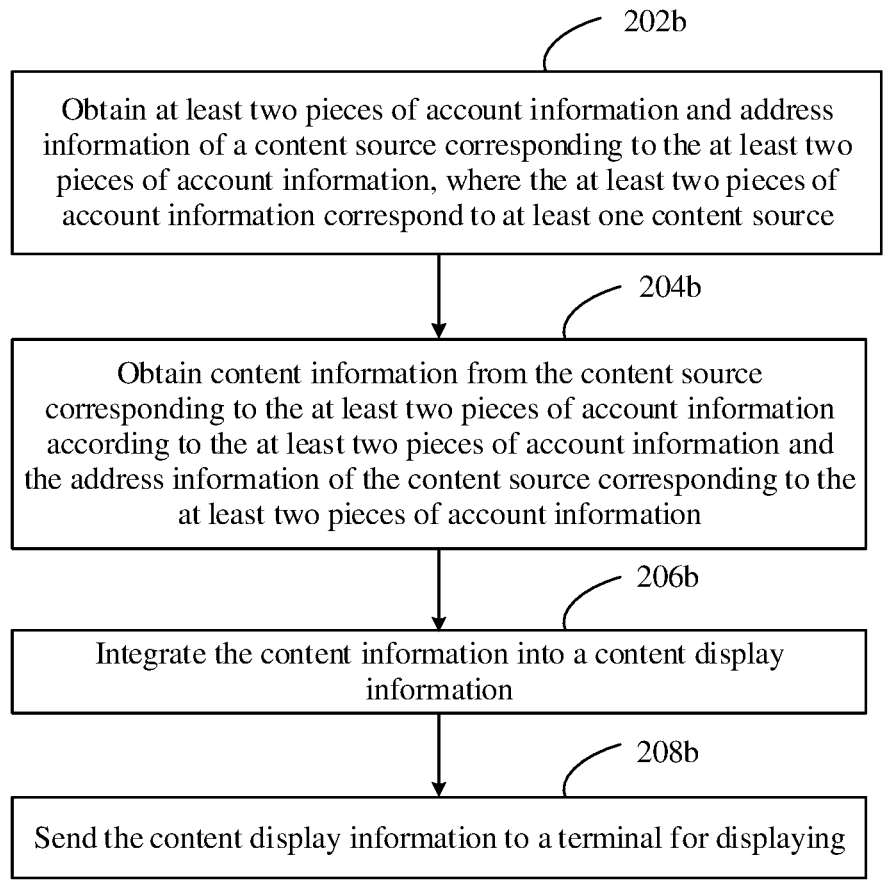
FIG. 2b is a schematic flowchart of still another information display method according to Embodiment 2 of the present invention.

When this method is executed on a side of a server, a flowchart of the method is shown in FIG. 2b, including the following steps.

Step 202b: Obtain at least two pieces of account information and address information of the content source corresponding to the at least two pieces of account information, where the at least two pieces of account information correspond to at least one content source.

Step 204b: Obtain content information from the content source corresponding to the at least two pieces of account information according to the at least two pieces of account information and the address information of the content source corresponding to the at least two pieces of account information.

Step 206b: Integrate the content information into a content display message.

Step 208b: Send the content display information to a terminal for displaying.

Optionally, the method described in the flowchart 2a in this embodiment of the present invention may be executed by the terminal by running an information aggregation application. A case of executing step 202a is the same as a case of executing step 102 in Embodiment 1, and details are not described herein.

In a specific implementation process, a user may register a system account used to log in to the foregoing information aggregation application. After logging in to the system account, the user may select or input, by using the terminal, a content source associated with the system account, and account information of the content source associated with the system account. Content related to the system account has been described in Embodiment 1, and details are not described herein. Optionally, regardless of whether the content source associated with the system account or the account information of the content source is added, modified, or deleted, the information aggregation application updates corresponding information into the stored account information of the content source in a timely manner.

The account information and the address information that are of the content source may be stored in the terminal, or may be stored in the server, or may be stored in the terminal and the server. When the server stores the account information and the address information that are of the content source, the obtaining request sent by the terminal to the server may include the account information and the address information that are of the content source, or may include only other information that can instruct the server to obtain the account information and the address information that are of the content source, such as system account information and content source information. The system account information includes a system account or a system account identifier, where the system account identifier uniquely indicates the system account. The server may obtain, according to the system account information, the stored account information and the stored address information that are of the content source associated with the system account. The content source information may be a content source identifier or address information of a content source. The content source identifier can uniquely indicate the address information of the content source, which may be a digit, a character, or the like, and a form of the content source identifier is not limited in the present invention.

Optionally, the obtaining request sent by the terminal to the server may further include specific task information. The task information indicates specific content of the content information that needs to be obtained. For example, the terminal sends the obtaining request to the server to obtain information about a purchased Taobao commodity, where the sent request includes the system account identifier and content source information of Taobao. After verifying a user identity according to the system account identifier in the obtaining request of the terminal, the server returns the information about the Taobao commodity. When the information about the commodity is obtained again, for example, an express status of the commodity is traced, the obtaining request sent by the terminal may include the specific task information. For example, the task information may carry a logistics ticket number of the commodity and logistics company information, requesting to obtain an express status of the commodity. Optionally, before the content information of the content source is obtained, the terminal further includes authentication. Content related to the authentication has been described in Embodiment 1 in detail, and details are not described herein.

Optionally, the terminal sends the obtaining request to the server in a POST manner, where a format of the message is a JSON (JavaScript Object Notation, JavaScript object notation) format. The terminal adds a parameter required for obtaining the content information to a BODY part of the JSON. After receiving a POST request of the terminal, the server returns the requested content information to the terminal. Optionally, it may be multi-threaded processing when the terminal sends the obtaining request to the server to obtain the content information of the content source. The multi-threaded processing indicates that the content information of the different content sources is obtained simultaneously.

Optionally, the content display information in step 204*a* of "receiving content display information sent by the server" may be the content information obtained according to the obtaining request from the content source when the server receives the obtaining request in step 202*a*; or may be content display information that has been stored in the server.

In a specific implementation process, the content display information is classified content information of a structured data format. The displaying the content display information is also displaying according to a classification of the content display information. The classification may be a user-defined classification, or may be selecting some classifications that have been set in the application. A specific form of the classification is not limited in this embodiment of the present invention. A type of the classification may include one or a combination of a user identifier, a service type, a content source, or the like. A classification based on a user identifier is a classification according to different user identifiers, where the user identifier refers to a field that can indicate a user identity, and users having a same user identifier are a same user. Account information of each content source corresponds to one user identifier. The user identifier may be a character, a digit, a combination of a letter and a digit, or the like, and a specific form of the user identifier is not limited. For example, the information aggregation application includes information about two different user identifiers, that is, the information aggregation application includes information about two different users; in that way, information having a same user identifier is classified into a category. If these two user identifiers respectively identify Jack and Tom, all content information of Jack is classified into a category, and information about Tom is classified into a category. A classification based on a service type is an attributive classification based on the content information. A type of the classification based on a service type may include one or more of an express, music, a photo, a contact message, an event prompt message, a bill, or the like. Content information having a same service type or having a same service type identifier is classified into a category. Specifically, the express category indicates that all content information including express information is classified into a category, which may specifically include express information in a content source such as Amazon, Jingdong, or Taobao. A music-based classification indicates that content information whose attribute is music is classified into a category, which may include web online music, qq music, music stored in the terminal, or the like. A photo-based classification indicates that obtained photo information is classified into a category, which may include a photo in flickr, a photo in instagram, or the like. The contact message category may include information such as an SMS message, a call, Weibo, or an email. The bill category indicates purchased bill information, such as purchase time of the bill, valid time of the bill, or usable time of the bill, which may specifically include a purchased air ticket, a purchased railway ticket, or a purchased cinema ticket. The classification based on a content source is a classification based on a source of the content information, that is, information of a same content source is classified into a category. For example, all content information obtained from Taobao is classified into a category, which may include content information of multiple Taobao accounts, or multiple pieces of content information included by one Taobao account, or the like. Similarly, content information obtained from Jingdong may be classified into a category; content information of Sina Weibo is classified into a category, or the like. A classification manner included in this embodiment of the present invention further includes one or a combination of the foregoing classifications. For example, the one or the combination of the classifications may include a level-1 classification and a level-2 classification, where the level-2 classification is subordinate to the level-1 classification. Specifically, if the level-1 classification is the classification based on a service type, such as an express, and the level-2 classification is the classification based on a user identifier, such as Jack and Tom, express information of Jack is displayed together, and express information of Tom is displayed together, but both the express information of Jack and that of Tom are displayed under the express category. The classification of the content information is described in this embodiment of the present invention by using only an example, and specific content and a specific form that are of the classification are not limited.

Optionally, the displaying the content display information includes: displaying the content display information according to update time of the content display information. Optionally, the information aggregation application may display the content display information in a reversed order according to the update time of the content display information. That is, the classified content display information is arranged and displayed in a reversed order according to the update time of the content display information corresponding to each classification. The reversed order indicates that the classified content display information is arranged in a reversed order according to the update time of the information, that is, latest content display information is first displayed in each classification, and then the content display information is arranged and displayed successively according to the update time.

Optionally, the displaying the content display information includes displaying the content display information by levels. The content display information may be displayed at N levels, where N is greater than or equal to 1. Optionally, displaying the content display information by levels corresponds to classifying the foregoing content display information. Specifically, for example, the content display information is displayed at two levels, where a level-1 display corresponds to a level-1 classification, a level-2 display corresponds to a level-2 classification, and the level-2 display is subordinate to the level-1 display. For example, a combination of two classifications is set in the information aggregation application. A level-1 classification based on a service type further includes a level-2 classification based on a content source, and corresponding content display information is respectively express information from Taobao and Jingdong, and photo information from flickr; in that way, the express information from Taobao and Jingdong is displayed under the express level-1 display, and the photo information from the flickr is displayed under the photo level-1 display; in addition, all express information from Taobao is displayed under the Taobao level-2 classification, and all express information from Jingdong is displayed under the Jingdong level-2 classification. If this content display information is further separately from different users, that is, the content display information has different user identifiers, the content display information may be displayed at three levels. Specific classification information is similar to display at two levels, and details are not described. Optionally, a first display page of the application, that is, a page including all level-1 display or level-1 classification information, may display all or a part of content display information of the level-1 display or that of the level-1 classification. When the part of the content display information is displayed, a display area of each level-1 display has a link for accessing a second display page corresponding to the content display information of the level-2 display. On the first display page of the application, all levels of display may be set to have a same display manner. For example, one piece of latest content display information is displayed under each level-1 display. All levels of display may also be set to have different display forms. For example, the first display page displays one piece of latest express information, two latest contact messages, and the like. A specific setting form may be selected and adjusted according to a specific situation, which is not limited in this embodiment of the present invention.

Optionally, the first display page or the second display page that displays the content display information has a link for accessing a corresponding content source.

Optionally, the displaying the content display information further includes updating the displayed content display information in real time. The updating the displayed content display information in real time may be updating according to update time set by a system or updating according to update time set by a user, or may be updating when an application detects a trigger mechanism, for example, detecting that the user taps a button or a link. The updating the displayed content display information in real time is the same as a case of Embodiment 1, and details are not described herein.

In a specific implementation process, after step 204a of "receiving content display information sent by the server", the method may further include storing the content display information. Storing the content display information is storing the integrated content display information. Storing the content display information may be executed before or after step 206a of displaying the content display information, or executed at the same time with step 206a. Storing the content display information further includes comparing the content display information with the stored content display information, and updating the stored content display information. The updating the stored content display information may specifically include: if current content display information exists, the stored content display information is replaced, and is updated to the current content display information; if the current content display information does not exist, the content display information is directly added/created. Optionally, the terminal stores the content display information in a database form.

In a specific implementation process, step 202b to step 206b may be executed at a time point of receiving the obtaining request of the terminal; or may be executed at a time set by default according to the information aggregation application or set by a user; or may be executed according to a time message in the obtaining request when the obtaining request of the terminal is received, so as to obtain the content information of the content source, where the time message may be a specific time point message, a time interval message, or the like. Therefore, after step 202b is executed, step 204b to step 206b may be directly executed; or another step may be executed before step 204b to step 206b, and then step 204b to step 206b are executed.

In a specific implementation process, a server first obtains address information and account information that are of a content source, including at least two pieces of account information and the address information of the content source corresponding to the at least two pieces of account information, where the at least two pieces of account information correspond to at least one content source; and the address information of the content source refers to an address that can access the content source, such as an Amazon address www.amazon.cn.

Before the server obtains the at least two pieces of account information and the address information of the content source corresponding to the at least two pieces of account information, the method further includes: receiving, by the server, an obtaining request sent by a terminal, where the obtaining request is used to instruct the server to obtain the content information of the content source; or receiving, by the server, timing information to trigger the server to obtain the content information of the content source.

Figure 2C:
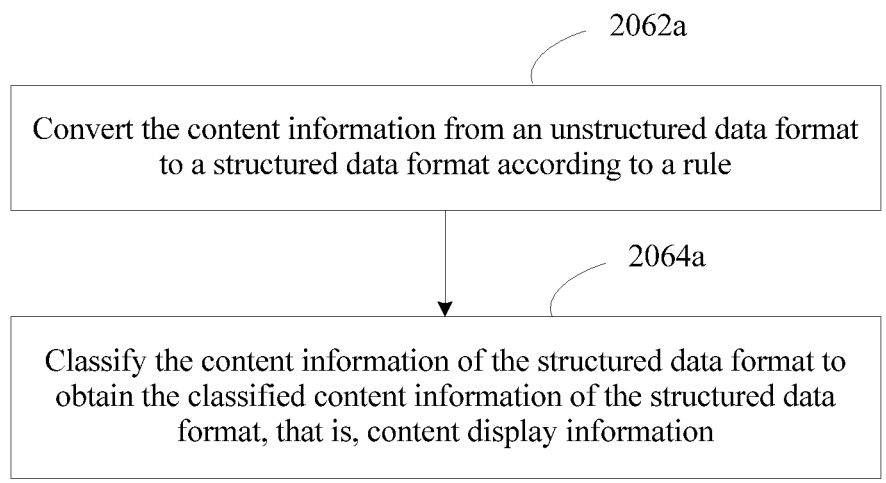
FIG. 2c is a schematic flowchart of an implementation method of still another information display method according to Embodiment 2 of the present invention.

The account information and the address information that are of the content source and that are obtained by the server may be the account information and the address information that are of the content source and that are obtained by the server from the obtaining request when the obtaining request of the terminal is received, or may be the account information and the address information that are of the content source and that are obtained by the server, according to other information that is in the obtaining request of the terminal and that indicates the account information and the address information that are of the content source, from the account information stored in the server, such as the foregoing system account information and the content source information. Optionally, it may be multi-threaded processing when the server obtains content information of different content sources. The multi-threaded processing indicates that the content information of the different content sources is obtained simultaneously. In a specific implementation process, an implementation manner of integrating the content information into content display information in step 206*b* is shown in FIG. 2*c*, including the following steps.

Step 2062*a*: Convert the content information from an unstructured data format to a structured data format according to a rule.

Step 2064*a*: Classify the content information of the structured data format to obtain the classified content information of the structured data format, that is, the content display information.

Figure 2D:
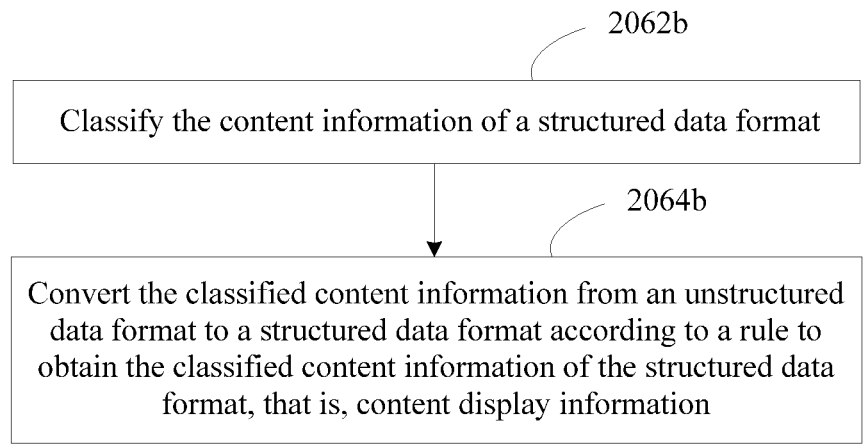
FIG. 2d is a schematic flowchart of another implementation method of still another information display method according to Embodiment 2 of the present invention.

In a specific implementation process, another implementation manner of integrating the content information into content display information in step 206*b* is shown in FIG. 2*d*, including the following steps.

Step 2062*b*: Classify the content information.

Step 2064*b*: Convert the classified content information from an unstructured data format to a structured data format according to a rule to obtain the classified content information of the structured data format, that is, the content display information.

The foregoing two implementation manners are similar to the two implementation manners of step 104 in Embodiment 1; however, the integrating the content information into content display information is executed by the server in this embodiment. These two implementation manners have been described in detail in Embodiment 1, and details are not described herein.

In a specific implementation process, after step 206*b* of "integrating the content information into content display information", the method may further include storing the content display information. Storing the content display information is storing the integrated content display information. Storing the content display information may be executed before or after step 208*b* of sending the content display information to a terminal for displaying, or executed at the same time with step 208*b*. Storing the content display information further includes comparing the content display information with the stored content display information, and updating the stored content display information. The updating the stored content display information may specifically include: if current content display information exists, the stored content display information is replaced, and is updated to the current content display information; if the current content display information does not exist, the content display information is directly added/created. Optionally, the server stores the content display information in a database form.

In a specific implementation process, if displaying the content display information includes obtaining the content information stored in the terminal, the terminal integrates the content information into the content display information, and displays the content display information together with the content display information sent by the server.

According to this embodiment, a terminal sends a request, and content information is obtained by using an application server, and the content information is integrated and then displayed to a user by using the terminal, so that it is concise and intuitive for the user to query information without cumbersomeness.

Figure 3:
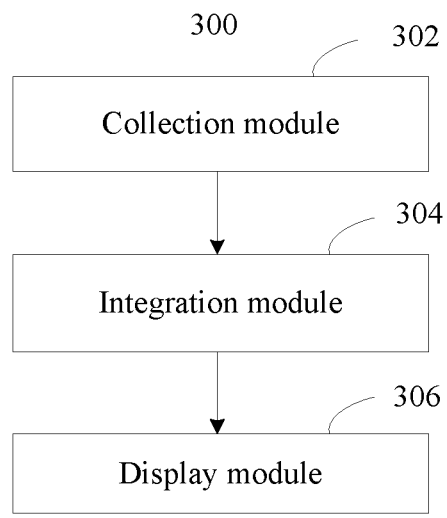
FIG. 3 is a schematic structural diagram of still another information display apparatus according to Embodiment 3 of the present invention.

Embodiment 3 of the present invention provides an information display apparatus 300, and a structural diagram of the apparatus 300 is shown in FIG. 3. This apparatus is located on a side of a terminal, and is configured to execute the method in Embodiment 1. All solutions and features that can be implemented in Embodiment 1 are applicable to this embodiment, and details are not described herein.

This information display apparatus 300 includes: a collection module 302, configured to obtain content information of at least one content source, where the at least one content source corresponds to at least two pieces of account information stored in the terminal; an integration module 304, configured to integrate the content information into content display information; and a display module 306, configured to display the content display information.

In a specific implementation process, the collection module 302 may include: an obtaining module, configured to obtain, by the terminal, the at least two pieces of account information and address information of the content source corresponding to the at least two pieces of account information; a sending module, configured to send a first obtaining request to the content source according to the at least two pieces of account information and the address information of the content source corresponding to the at least two pieces of account information; and a receiving module, configured to receive the content information sent by the content source according to the first obtaining request.

Alternatively, the collection module 302 may include: a sending module, configured to send a second obtaining request to a server; and a receiving module, configured to receive the content information that is obtained by the server according to the second obtaining request from the content source corresponding to the at least two pieces of account information.

In a specific implementation process, the integration module 304 includes: a conversion module, configured to convert, according to a rule, the content information obtained by the collection module from an unstructured data format to a structured data format, or configured to convert classified content information from an unstructured data format to a structured data format according to a rule to obtain content display information; and a classification module, configured to classify the content information of the structured data format to obtain content display information, or configured to classify the content information obtained by the collection module.

Optionally, the apparatus 300 further includes a storage module, configured to store the content display information.

According to the information display apparatus provided in this embodiment, content information of a content source is obtained, integrated, and then displayed to a user by classification, so that it is concise and intuitive for the user to query information without cumbersomeness.

Figure 4A:
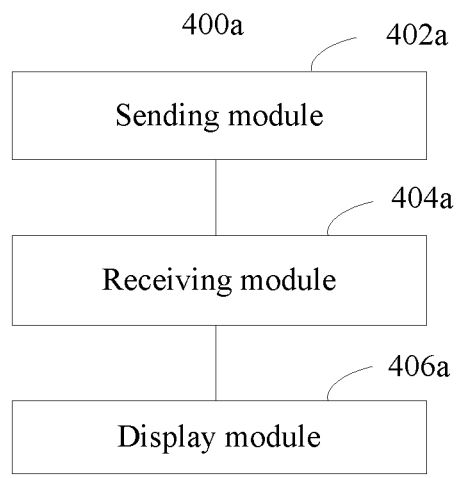
FIG. 4a is a schematic structural diagram of an information display apparatus according to Embodiment 4 of the present invention.
Figure 4B:
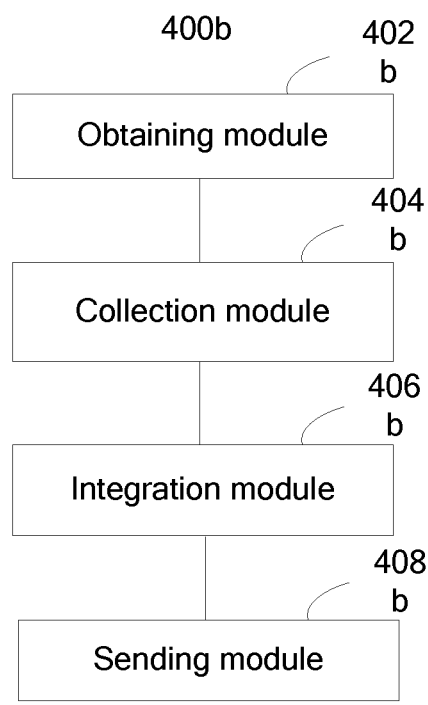
FIG. 4b is a schematic structural diagram of still another information display apparatus according to Embodiment 4 of the present invention.

Embodiment 4 of the present invention provides an information display apparatus 400, and a structural diagram of the apparatus 400 is shown in FIG. 4. The apparatus 400 is configured to execute the method in Embodiment 2. This apparatus is an apparatus 400*a* when located on a side of a terminal, and executes the method in FIG. 2*a*. This apparatus is an apparatus 400*b* when located on a side of a server, and executes the method in FIG. 2*b*. All solutions and features that can be implemented in Embodiment 2 are applicable to this embodiment, and details are not described herein.

This information display apparatus 400*a* includes: a sending module 402*a*, configured to send an obtaining request to a server to obtain content information of at least one content source, where the at least one content source corresponds to at least two pieces of account information stored in the terminal; a receiving module 404*a*, configured to receive content display information sent by the server according to the obtaining request, where the content display information is obtained by integrating, by the server, content information obtained from the content source corresponding to the at least two pieces of account information; and a display module 406*a*, configured to display the content display information.

This information display apparatus 400*b* includes: an obtaining module 402*b*, configured to obtain at least two pieces of account information and address information of the content source corresponding to the at least two pieces of account information, where the at least two pieces of account information correspond to at least one content source; a collection module 404*b*, configured to obtain content information from the content source corresponding to the at least two pieces of account information according to the at least two pieces of account information and the address information of the content source corresponding to the at least two pieces of account information; an integration module 406*b*, configured to integrate the content information into content display information; and a sending module 408*b*, configured to send the content display information to a terminal for displaying.

In a specific implementation process, the integration module 406*b* further includes: a conversion module, configured to convert, according to a rule, the content information obtained by the collection module from an unstructured data format to a structured data format, or configured to convert classified content information from an unstructured data format to a structured data format according to a rule to obtain content display information; and a classification module, configured to classify the content information of the structured data format to obtain content display information, or configured to classify the content information obtained by the collection module.

According to the apparatus in this embodiment, content information is obtained, integrated, and then displayed to a user, so that it is concise and intuitive for the user to query information without cumbersomeness.

Figure 5:
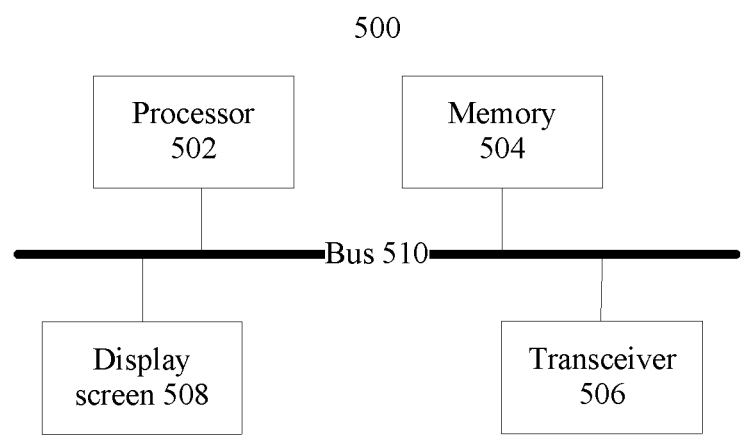
FIG. 5 is a schematic structural diagram of hardware of an information display terminal according to Embodiment 5 of the present invention.

FIG. 5 is a schematic structural diagram of hardware of a terminal according to Embodiment 5 of the present invention. As shown in FIG. 5, a terminal 500 includes a processor 502, a memory 504, a transceiver 506, a display screen 508, and a bus 510. The processor 502, the memory 504, the transceiver 506, and the display screen 508 perform communication by using the bus 510.

The terminal may be configured to execute the methods executed by the terminals in Embodiment 1, Embodiment 2, and Embodiment 3. All content and effects related to the terminal in a method embodiment disclosed in the present invention may be implemented by using the terminal in this embodiment; therefore, all content and effects in the method embodiment are applicable to this embodiment.

The terminal may implement the method in this embodiment of the present invention by executing an information aggregation application. The information aggregation application may include any application installed on the terminal, including but not limited to a browser, an email, an instant messaging service, word processing, keyboard virtualization, a window widget (Widget), encryption, digital rights management, voice recognition, voice duplication, positioning (such as a function provided by a global positioning system), music playing, and the like.

The memory 504 may be configured to store a software program and a module. By running the software program and the module that are stored in the memory 504, the processor 502 executes various function applications of the terminal and implements data processing. The memory 504 mainly includes a program storage area and a data storage area, where the program storage area may store an operating system, an application program required by at least one function, such as a sound playing program or an image playing program. The data storage area may store data (such as audio data or a phone book) created according to use of the terminal, and the like. In a specific implementation manner of the present invention, the memory may include a volatile memory, such as a nonvolatile random access memory (NVRAM for short), a phase change RAM (PRAM for short), or a magnetoresistive RAM (MRAM for short), or may include a non-volatile memory, such as at least one magnetic disk storage device, an electrically erasable programmable read-only memory (EEPROM for short), or a flash storage device such as an NOR flash memory (NOR flash memory) or an NAND flash memory. The non-volatile memory stores the operating system and the application program that are executed by the processor 502. The processor 502 loads, from the non-volatile memory, a running program and data to a memory, and stores digital content into a massive storage apparatus. The operating system includes various components and/or drivers that are configured to control and manage a regular system task, such as memory management, storage device control, or power management, and facilitate communication between various software and hardware. In this implementation manner of the present invention, the operating system may be an Android system of Google, an iOS system developed by Apple, a Windows operating system developed by Microsoft, or the like; or may be an embedded operating system such as Vxworks.

The processor 502 is a control center of the terminal, is connected to all parts of the entire terminal by using various interfaces and lines, and performs various functions of the terminal and/or data processing by running or performing the software program and/or the module that are/is stored in the memory 504 and invoking data stored in the memory 504. The processor 502 may include an integrated circuit (Integrated Circuit, IC for short), for example, may include a single packaged IC, or may include multiple packaged ICs having a same function or different functions. For example, the processor 502 may include only a central processing unit (CPU for short), or may be a combination of a GPU, a digital signal processor (DSP for short), and a control chip (such as a baseband chip) in the transceiver 506. In this implementation manner of the present invention, the CPU may be a single computing core, or may include multiple computing cores.

The transceiver 506 is configured to establish a communication channel, so that the terminal is connected to a remote server through the communication channel, and downloads media data from the remote server. In a specific implementation process of the present invention, the transceiver 506 is specifically configured to: according to an instruction of the processor 502, obtain content information of a content source from the content source, or send an obtaining request to the server and receive a response message of the server, and the like. The transceiver 506 may include a communications module such as a wireless local area network (wireless LAN for short) module, a Bluetooth module, or a baseband module, and a radio frequency (RF for short) circuit corresponding to the communications module, and is configured to perform wireless local area network communication, Bluetooth communication, infrared communication and/or cellular communications system communication, such as wideband code division multiple access (W-CDMA for short) and/or high speed downlink packet access (HSDPA for short). The communications module is configured to control communication between components in the terminal, and may support direct memory access.

The radio frequency circuit is configured to receive and send information, or receive and send a signal during a call. For example, after downlink information of a base station is received, the processor 502 processes the downlink information; in addition, designed uplink data is sent to the base station. Generally, the radio frequency circuit includes a well-known circuit used to perform these functions, which includes but is not limited to an antenna system, a radio frequency transceiver, one or more amplifiers, a tuner, one or more oscillators, a digital signal processor, a codec chipset, a subscriber identity module (SIM) card, a memory, and the like. In addition, the radio frequency circuit may further communicate with a network and another device by means of wireless communication. The wireless communication may use any communications standard or protocol, including but not limited to a GSM (Global System for Mobile Communications), a GPRS (General Packet Radio Service), CDMA (Code Division Multiple Access), WCDMA (Wideband Code Division Multiple Access), a high speed uplink packet access (HSUPA) technology, LTE (Long Term Evolution), an email, an SMS (Short Messaging Service), and the like.

In a specific implementation process of the present invention, in a first implementation manner: the transceiver 506 may be configured to obtain content information of at least one content source, where the at least one content source corresponds to at least two pieces of account information stored in the terminal; and the processor 502 may be configured to integrate the content information into content display information.

Optionally, the transceiver 506 may be specifically configured to: receive the at least two pieces of account information and address information of the content source corresponding to the at least two pieces of account information, where the at least two pieces of account information and the address information are obtained by the processor 502; send a first obtaining request to the content source according to the at least two pieces of account information and the address information of the content source corresponding to the at least two pieces of account information; and receive the content information sent by the content source according to the first obtaining request.

Optionally, the transceiver 506 may be specifically configured to: send a second obtaining request to a server; and receive the content information that is obtained by the server according to the second obtaining request from the content source corresponding to the at least two pieces of account information.

In a second implementation manner: the transceiver 506 may be configured to send an obtaining request to a server to obtain content information of at least one content source, where the at least one content source corresponds to at least two pieces of account information stored in the terminal; the transceiver 506 may be further configured to receive content display information sent by the server according to the obtaining request, where the content display information is obtained by integrating, by the server, content information obtained from the content source corresponding to the at least two pieces of account information; and the processor 502 may be configured to parse the received content display information.

In a specific implementation process, the processor 502 is further configured to output the content display information to the display screen 508 for displaying.

The display screen 508 is configured to output a text, a picture, and/or a video. The display screen may include a display panel, for example, a display panel configured in a form of an LCD (Liquid Crystal Display), an OLED (Organic Light-Emitting Diode), a field emission display (FED for short), or the like. Alternatively, the display screen may include a reflective display such as an electrophoretic display, or a display using a technology of interferometric modulation of light. The display screen may include a single display or multiple displays with different sizes.

In a specific implementation process of the present invention, the display screen 508 may be configured to display the content display information.

Optionally, in an implementation manner, that the processor 502 is configured to integrate the content information into content display information may specifically include: converting the content information from an unstructured data format to a structured data format according to a rule; and classifying the content information of the structured data format to obtain the content display information.

Optionally, in another implementation manner, that the processor 502 is configured to integrate the content information into content display information may specifically include: classifying the content information; and converting the classified content information from an unstructured data format to a structured data format according to a rule to obtain the content display information.

In this embodiment of the present invention, the terminal may further include an input unit. The input unit is configured to implement interaction between a user and the terminal and/or input information into the terminal. For example, the input unit may receive digit or character information that is input by the user, so as to generate signal input related to user setting or function control. In a specific implementation manner of the present invention, the input unit may be a touch panel; or may be another human-machine interaction interface, such as a physical input key and a microphone; or may be another external information capture apparatus, such as a camera. The touch panel is also referred to as a touchscreen or a touch-controlled screen, and may collect an operation action of touching or approaching performed by the user on the touch panel, for example, an operation action performed by the user on the touch panel or at a position close to the touch panel by using any proper object or accessory such as a finger or a stylus, and a corresponding connecting apparatus is driven according to a preset program. In another implementation manner of the present invention, the physical input key used by the input unit may include but is not limited to one or more of a physical keyboard, a function button (such as a volume control button or a switch button), a trackball, a mouse, a joystick, or the like. An input unit in a microphone form may collect a voice that is input by the user or an environment, and convert the voice to a command that is in an electrical signal form and that may be executed by the processor 502. In a specific implementation manner of the present invention, the touch panel used by the input unit may also be used as a display panel of the display screen simultaneously. For example, after detecting a gesture operation of touching or approaching performed on the touch panel, the touch panel transmits the gesture operation to the processor 502 to determine a type of a touch event, and then the processor provides corresponding visual output on the display panel according to the type of the touch event. Although the input unit and the display screen 508 serve as two independent parts to implement input and output functions of the terminal, in some embodiments, the touch panel and the display panel may be integrated to implement the input and output functions of the terminal. For example, the display screen may display various graphical user interfaces (GUI for short) as virtual control components, which include but are not limited to a window, a scrollbar, an icon, and a scrapbook, so that a user performs an operation in a touch manner.

In a specific implementation process of the present invention, the input unit is specifically configured to detect an operation of the user, where the detecting an operation of the user includes detecting that the user starts the information aggregation application. For example, it is detected that the user taps an icon corresponding to the information aggregation application, or presses a shortcut key corresponding to the information aggregation application. A manner of starting the information aggregation application is not limited in this embodiment of the present invention. The detecting an operation of the user may further include detecting that the user taps an update button to view content display information, and the like. The input unit is further configured to detect all operations of interaction between the user and the terminal, for example, detecting that the user registers or logs in to a system account, or detecting that the user sets a classification of the application. The classification of the application may be a user-defined classification, or may be selecting some classifications that have been set in the application. Optionally, a type of the classification may include one or a combination of a classification based on a user identifier, a classification based on a service type, a classification based on a content source, or the like. The classification has been described in detail in Embodiment 1, and details are not described herein.

It should be noted that although the terminal 500 shown in FIG. 5 shows only the processor 502, the memory 504, the transceiver 506, the display screen 508, and the bus 510, in a specific implementation process, a person skilled in the art should understand that the terminal 500 further includes another component required for implementing normal running. Furthermore, a person skilled in the art should understand that according to a specific requirement, the terminal 500 may further include a hardware component that implements another additional function. In addition, a person skilled in the art should understand that the terminal 500 may also include only a component required for implementing this embodiment of the present invention, without a need of including all components shown in FIG. 5.

A hardware structure shown in FIG. 5 and the foregoing description are applicable to various information display terminal devices provided in this embodiment of the present invention. A person of ordinary skill in the art may understand that all or some of the steps of the foregoing method may be implemented by a program instructing relevant hardware. The program may be stored in a computer-readable storage medium. The computer-readable storage medium includes a ROM, a RAM, an optical disc, and the like.

Figure 6:
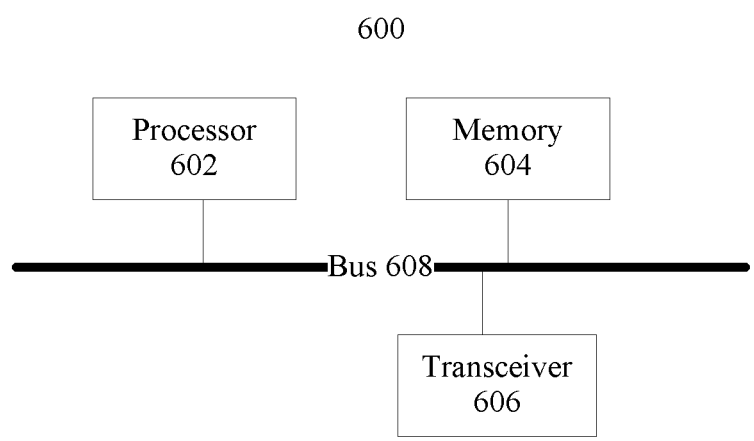
FIG. 6 is a schematic structural diagram of hardware of an information display server according to Embodiment 6 of the present invention.

FIG. 6 is a schematic structural diagram of hardware of a terminal according to Embodiment 6 of the present invention. As shown in FIG. 6, a server 600 includes a processor 602, a memory 604, a transceiver 606, and a bus 608. The processor 602, the memory 604, and the transceiver 606 perform communication by using the bus 608.

The server may be configured to execute the methods executed by the servers in Embodiment 1, Embodiment 2, and Embodiment 3. All content and effects related to the server in a method embodiment disclosed in the present invention may be implemented by using the server in this embodiment; therefore, all content and effects in the method embodiment are applicable to this embodiment.

The memory 604 may be configured to store a software program and a module. By running the software program and the module that are stored in the memory 604, the processor 602 executes various function applications of the server and implements data processing. The memory 604 mainly includes a program storage area and a data storage area, where the program storage area may store an operating system, an application program required by at least one function, such as a sound playing program or an image playing program. The data storage area may store data (such as audio data or a phone book) created according to use of the server, and the like. In a specific implementation manner of the present invention, the memory 604 may include a volatile memory, such as a nonvolatile random access memory (NVRAM for short), a phase change RAM (PRAM for short), or a magnetoresistive RAM (MRAM for short), or may include a non-volatile memory, such as at least one magnetic disk storage device, an electrically erasable programmable read-only memory (EEPROM for short), or a flash storage device such as an NOR flash memory (NOR flash memory) or an NAND flash memory. The non-volatile memory stores the operating system and the application program that are executed by the processor 602. The processor 602 loads, from the non-volatile memory, a running program and data to a memory, and stores digital content into a massive storage apparatus. The operating system includes various components and/or drivers that are configured to control and manage a regular system task, such as memory management, storage device control, or power management, and facilitate communication between various software and hardware. In this implementation manner of the present invention, the operating system may be an Android system of Google, an iOS system developed by Apple, a Windows operating system developed by Microsoft, or the like; or may be an embedded operating system such as Vxworks.

The processor 602 is a control center of the server, is connected to all parts of the entire server by using various interfaces and lines, and performs various functions of the server and/or data processing by running or performing the software program and/or the module that are/is stored in the memory 604 and invoking data stored in the memory 604. The processor 602 may include an integrated circuit (IC for short), for example, may include a single packaged IC, or may include multiple packaged ICs having a same function or different functions. For example, the processor 602 may include only a central processing unit (CPU for short), or may be a combination of a GPU, a digital signal processor (DSP for short), and a control chip (such as a baseband chip) in the transceiver 606. In this implementation manner of the present invention, the CPU may be a single computing core, or may include multiple computing cores.

The transceiver 606 is configured to establish a communication channel, so that the server is connected to a remote server or a terminal through the communication channel, and downloads media data from the remote server or sends media data to the terminal. In a specific implementation process of the present invention, the transceiver 606 is specifically configured to: according to an instruction of the processor 602, obtain content information of a content source from the content source, or send an obtaining request to the server and receive a response message of the server, and the like. The transceiver 606 may include a communications module such as a wireless local area network (wireless LAN for short) module, a Bluetooth module, or a baseband module, and a radio frequency (RF for short) circuit corresponding to the communications module, and is configured to perform wireless local area network communication, Bluetooth communication, infrared communication and/or cellular communications system communication, such as wideband code division multiple access (W-CDMA for short) and/or high speed downlink packet access (HSDPA for short). The communications module is configured to control communication between components in the server, and may support direct memory access.

The radio frequency circuit is configured to receive and send information, or receive and send a signal during a call. For example, after downlink information of a base station is received, the processor 602 processes the downlink information; in addition, designed uplink data is sent to the base station. Generally, the radio frequency circuit includes a well-known circuit used to perform these functions, which includes but is not limited to an antenna system, a radio frequency transceiver, one or more amplifiers, a tuner, one or more oscillators, a digital signal processor, a codec chipset, a subscriber identity module (SIM) card, a memory, and the like. In addition, the radio frequency circuit may further communicate with a network and another device by means of wireless communication. The wireless communication may use any communications standard or protocol, including but not limited to a GSM (Global System for Mobile Communications), a GPRS (General Packet Radio Service, general packet radio service), CDMA (Code Division Multiple Access), WCDMA (Wideband Code Division Multiple Access), a high speed uplink packet access (HSUPA) technology, LTE (Long Term Evolution), an email, an SMS (short messaging service), and the like.

In a specific implementation process of the present invention, in a first implementation manner: optionally, the processor 602 may be configured to obtain at least two pieces of account information and address information of the content source corresponding to the at least two pieces of account information, where the at least two pieces of account information correspond to at least one content source; the transceiver 606 may be configured to obtain content information from the content source corresponding to the at least two pieces of account information according to the at least two pieces of account information and the address information of the content source corresponding to the at least two pieces of account information; the processor 602 is further configured to integrate the content information into a content display message; and the transceiver 606 is further configured to send the content display information to a terminal for displaying.

Optionally, that the processor 602 is configured to integrate the content information into content display information specifically includes: converting the content information from an unstructured data format to a structured data format according to a rule; and classifying the content information of the structured data format to obtain the classified content information of the structured data format, that is, the content display information.

Optionally, that the processor 602 is configured to integrate the content information into content display information specifically includes: classifying the content information; and converting the classified content information from an unstructured data format to a structured data format according to a rule to obtain the classified content information of the structured data format, that is, the content display information.

In a second implementation manner: optionally, the processor 602 may be configured to obtain at least two pieces of account information and address information of the content source corresponding to the at least two pieces of account information, where the at least two pieces of account information correspond to at least one content source; the transceiver 606 may be configured to obtain content information from the content source corresponding to the at least two pieces of account information according to the at least two pieces of account information and the address information of the content source corresponding to the at least two pieces of account information; and the transceiver 606 is further configured to send the content display information to a terminal for displaying.

It should be noted that although the server 600 shown in FIG. 6 shows only the processor 602, the memory 604, the transceiver 606, and the bus 608, in a specific implementation process, a person skilled in the art should understand that the server 600 further includes another component required for implementing normal running. Furthermore, a person skilled in the art should understand that according to a specific requirement, the server 600 may further include a hardware component that implements another additional function. In addition, a person skilled in the art should understand that the server 600 may also include only a component required for implementing this embodiment of the present invention, without a need of including all components shown in FIG. 6.

A person of ordinary skill in the art may understand that all or some of the steps of the foregoing method may be implemented by a program instructing relevant hardware. The program may be stored in a computer-readable storage medium. The computer-readable storage medium includes a ROM, a RAM, an optical disc, and the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. An information display method comprising:
transmitting, by an information aggregation application executing on a terminal, a content information request for a purchasable commodity to at least two or more content sources, wherein the content information request comprises, for each of the at least two or more content sources, at least two pieces of registered account information used by the content source to verify the terminal;
receiving, by the information aggregation application, content information for the purchasable commodity from the at least two or more content sources in response to the content information request;
converting, by the information aggregation application, the content information from an unstructured data format to a structured data format according to a rule corresponding to a content source from which the content information was received;
classifying, by the information aggregation application, the content information of the structured data format based on two or more classifications to obtain classified content information of the structured data format, wherein the two or more classifications include at least two of: a user identifier, a service type, and a content source; and
displaying, by the terminal, the classified content information comprising at least a first level display page and a second level display page,
the first level display page displaying a first part of the classified content information corresponding to a first of the two or more classifications and a link for accessing the second level display page, and
the second level display page displaying a second part of the classified content information of the purchasable commodity, wherein the first level display page or the second level display page includes a link for accessing a content source of the at least two or more content sources.

2. The method according to claim 1, wherein the displaying the classified content information further comprises displaying the classified content information in a reversed order according to update time of the classified content information.

3. The method according to claim 1, wherein the first level display page and the second level display page have a same display manner.

4. The method according to claim 1, wherein the first at least two pieces of registered account information correspond to one user identifier.

5. The method according to claim 1, wherein the at least two pieces of registered account information correspond to a user or terminal identifier.

6. A terminal comprising:
a processor; and
a memory for storing instructions which, when executed by the processor, cause an information aggregation application executing on the terminal to:
transmit a content information request for a purchasable commodity to at least two or more content sources, wherein the content information request comprises, for each of the at least two or more content sources, at least two pieces of registered account information used by the content source to verify the terminal;
receive, by the information aggregation application, content information for the purchasable commodity from the at least two or more content sources in response to the content information request;
convert, by the information aggregation application, the content information from an unstructured data format to a structured data format according to a rule corresponding to a content source from which the content information was received;
classify, by the information aggregation application, the content information of the structured data format based on two or more classifications to obtain classified content information of the structured data format, wherein the two or more classifications include at least two of: a user identifier, a service type, and a content source; and
display the classified content information comprising at least a first level display page and a second level display page,
the first level display page displaying a first part of the classified content information corresponding to a first of the two or more classifications and a link for accessing the second level display page, and
the second level display page displaying a second part of the classified content information of the purchasable commodity, wherein the first level display page or the second level display page includes a link for accessing a content source of the at least two or more content sources.

7. The terminal according to claim 6, wherein displaying the classified content information comprises displaying the classified content information in a reversed order according to update time of the classified content information.

8. The terminal according to claim 6, wherein the first level display page and the second level display page have a same display manner.

9. The terminal according to claim 6, wherein the at least two pieces of registered account information correspond to two identifiers of a subscriber identity module card.

10. The terminal according to claim 6, wherein the at least two pieces of registered account information correspond to a user or terminal identifier.

* * * * *